(12) United States Patent
Zednicek et al.

(10) Patent No.: US 8,199,461 B2
(45) Date of Patent: Jun. 12, 2012

(54) REFRACTORY METAL PASTE FOR SOLID ELECTROLYTIC CAPACITORS

(75) Inventors: Stanislav Zednicek, Lanskroun (CZ); William A. Millman, Paignton (GB)

(73) Assignee: AVX Corporation, Myrtle Beach, SC (US)

( * ) Notice: Subject to any disclaimer, the term of this patent is extended or adjusted under 35 U.S.C. 154(b) by 271 days.

(21) Appl. No.: 12/474,311

(22) Filed: May 29, 2009

(65) Prior Publication Data
US 2010/0302713 A1    Dec. 2, 2010

(51) Int. Cl.
*H01G 9/145* (2006.01)
*H01G 4/228* (2006.01)

(52) U.S. Cl. .................. 361/528; 361/532; 361/540

(58) Field of Classification Search .......... 361/523, 361/528, 529, 532, 540, 538; 29/25.03
See application file for complete search history.

(56) References Cited

U.S. PATENT DOCUMENTS

| | | | |
|---|---|---|---|
| 3,345,545 A | | 10/1967 | Bourgault |
| 3,818,581 A | * | 6/1974 | Vartanian et al. ............ 29/25.03 |
| 4,090,231 A | * | 5/1978 | Millard et al. ............... 361/529 |
| 4,520,430 A | * | 5/1985 | Long et al. .................. 361/529 |
| 4,599,788 A | * | 7/1986 | Love et al. .................. 29/25.03 |
| 4,945,452 A | | 7/1990 | Sturmer et al. |
| 5,266,622 A | | 11/1993 | Mazanek et al. |
| 5,357,399 A | | 10/1994 | Salisbury |
| 5,390,074 A | | 2/1995 | Hasegawa et al. |
| 5,457,862 A | | 10/1995 | Sakata et al. |
| 5,473,503 A | | 12/1995 | Sakata et al. |
| 5,723,535 A | | 3/1998 | Krismer et al. |
| 5,729,428 A | | 3/1998 | Sakata et al. |
| 5,750,194 A | | 5/1998 | Watanabe et al. |
| 5,812,367 A | | 9/1998 | Kudoh et al. |
| 5,949,639 A | | 9/1999 | Maeda et al. |
| 6,191,936 B1 | | 2/2001 | Webber et al. |
| 6,197,252 B1 | | 3/2001 | Bishop et al. |

(Continued)

OTHER PUBLICATIONS

*Adsorption of Gases in Multimolecular Layers*, Brunauer et al., The Journal of the American Chemical Society, vol. 60, Jan.-Jun. 1938, pp. 309-319.

(Continued)

*Primary Examiner* — Eric Thomas
(74) *Attorney, Agent, or Firm* — Dority & Manning, P.A.

(57) ABSTRACT

A solid electrolytic capacitor that contains a capacitor element that includes an anode body, dielectric layer, and solid electrolyte is provided. The capacitor also contains an anode lead that is electrically connected to the anode body. Contrary to conventional capacitors in which the lead is welded or connected using a layer of seed particles, a refractory metal paste (e.g., tantalum paste) is employed in the present invention to electrically connect the anode lead to the anode body. The use of such a refractory metal paste allows the anode lead to be sinter bonded to a surface of the anode body after it is pressed. In this manner, a strong and reliable connection may be achieved without substantially decreasing the surface area of the lead that is available for connection to a termination. The paste of the present invention generally contains particles of a relatively small size. Due to in part to the relatively small size of the particles, the paste may have a relatively low viscosity, allowing it to be readily handled and applied to an anode lead and/or anode body during manufacture of the capacitor. Further, the thickness of the applied paste may also be relatively thin and still achieve the desired binding of the lead to the anode body.

12 Claims, 3 Drawing Sheets

U.S. PATENT DOCUMENTS

| | | |
|---|---|---|
| 6,262,878 B1 | 7/2001 | Shirashige et al. |
| 6,322,912 B1 | 11/2001 | Fife |
| 6,391,275 B1 | 5/2002 | Fife |
| 6,416,730 B1 | 7/2002 | Fife |
| 6,527,937 B2 | 3/2003 | Fife |
| 6,576,099 B2 | 6/2003 | Kimmel et al. |
| 6,592,740 B2 | 7/2003 | Fife |
| 6,639,787 B2 | 10/2003 | Kimmel et al. |
| 6,643,121 B1 | 11/2003 | Huntington |
| 6,673,389 B1 | 1/2004 | Huntington |
| 6,699,767 B1 | 3/2004 | Huntington |
| 6,751,085 B1 | 6/2004 | Huntington |
| 6,775,127 B2 * | 8/2004 | Yoshida .................. 361/528 |
| 6,808,541 B2 | 10/2004 | Maeda |
| 6,813,140 B1 | 11/2004 | Huntington |
| 6,849,292 B1 | 2/2005 | Huntington |
| 6,995,972 B2 | 2/2006 | Fujii et al. |
| 7,116,548 B2 | 10/2006 | Satterfield, Jr. et al. |
| 7,220,397 B2 | 5/2007 | Kimmel et al. |
| 7,262,511 B2 | 8/2007 | Osaka et al. |
| 7,323,395 B2 | 1/2008 | Huntington |
| 7,341,705 B2 | 3/2008 | Schnitter |
| 7,342,775 B2 | 3/2008 | Hahn et al. |
| 7,381,396 B2 | 6/2008 | Thomas et al. |
| 7,393,771 B2 | 7/2008 | Hozoji et al. |
| 7,419,926 B2 | 9/2008 | Schnitter et al. |
| 7,460,358 B2 | 12/2008 | Biler |
| 7,515,396 B2 | 4/2009 | Biler |
| 2003/0070920 A1 | 4/2003 | Shah et al. |
| 2005/0270725 A1 * | 12/2005 | Hahn et al. .................. 361/533 |
| 2008/0062617 A1 | 3/2008 | Edson et al. |
| 2008/0106852 A1 | 5/2008 | Amita et al. |

OTHER PUBLICATIONS

Product Information on Borcher's Wetting and Dispersing Additives from Borchers GmbH, Apr. 2005, 6 pages.

* cited by examiner

REFRACTORY METAL PASTE FOR SOLID ELECTROLYTIC CAPACITORS

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The resulting capacitor element contains a lead wire that extends outwardly from the anode body and is welded at its end to an anode termination. The attachment of the metal lead wire to an anode body is often difficult due to pressing requirements and the small size of the capacitors. As such, great care must be taken to ensure that the anode body is not damaged, which increases manufacturing complexity, time, and costs. Further, the wire itself occupies space within the anode body and thus limits the volumetric efficiency that may be achieved. In response to these challenges, techniques have thus been developed that attempt to eliminate the metal lead wire from the capacitor. U.S. Pat. No. 5,357,399 to Salisbury, for example, describes a capacitor that contains a tantalum substrate sinter bonded to a tantalum wafer using a seed layer of tantalum particles. While avoiding the use of a lead wire, however, the seed layer particles present a new problem in that they are often difficult to handle and apply to the wafer during manufacturing. Thus, despite the benefits achieved, a need for improvement still remains.

SUMMARY OF THE INVENTION

In accordance with one embodiment of the present invention, a solid electrolytic capacitor is disclosed that comprises a capacitor element, anode lead, anode termination, and cathode termination. The capacitor element includes an anode body, a dielectric layer overlying at least a portion of the anode body, and a cathode overlying at least a portion of the dielectric layer, the cathode including a solid electrolyte. The anode lead is electrically connected to a surface of the anode body by a refractory metal paste that contains a plurality of particles, wherein the particles are sinter bonded to both the anode lead and the anode body. The anode termination is electrically connected to the anode lead and the cathode termination is electrically connected to the cathode.

In accordance with another embodiment of the present invention, a method for electrically connecting a lead to an anode body of a capacitor element is disclosed. The method comprises applying a refractory metal paste to the lead, the anode body, or both, wherein the refractory metal paste includes a plurality of particles. The lead is positioned adjacent to the anode body. The refractory metal paste is sintered to electrically connect the anode lead to the anode body.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor containing a capacitor element that includes an anode body, dielectric layer, and solid electrolyte. The capacitor also contains an anode lead that is electrically connected to the anode body. Contrary to conventional capacitors in which the lead is embedded in the anode body or connected using a layer of seed particles, a refractory metal paste (e.g., tantalum paste) is employed in the present invention to electrically connect the anode lead to the anode body. The use of such a refractory metal paste allows the anode lead to be sinter bonded to a surface of the anode body after it is pressed. In this manner, a strong and reliable connection may be achieved without substantially decreasing the surface area of the lead that is available for connection to a termination.

The paste of the present invention generally contains particles of a relatively small size, such as having an average size of from about 0.01 to about 20 micrometers, in some embodiments from about 0.1 to about 15 micrometers, and in some embodiments, from about 1 to about 10 micrometers. Due in part to the relatively small size of the particles, the paste may have a relatively low viscosity, allowing it to be readily handled and applied to an anode lead and/or anode body during manufacture of the capacitor. The viscosity may, for instance, range from about 5 to about 200 Pascal-seconds, in some embodiments from about 10 to about 150 Pascal-seconds, and in some embodiments, from about 20 to about 100 Pascal-seconds, as measured with a Brookfield DV-1 viscometer using Spindle No. 18 operating at 12 rpm and 25° C. If desired, thickeners or other viscosity modifiers may be employed in the paste to increase or decrease viscosity. Further, the thickness of the applied paste may also be relatively thin and still achieve the desired binding of the lead to the anode body. For example, the thickness of the paste may be from about 0.01 to about 50 micrometers, in some embodiments from about 0.5 to about 30 micrometers, and in some embodiments, from about 1 to about 25 micrometers.

The particles used in the paste are formed from a composition that includes a refractory metal, such as tungsten, molybdenum, niobium, tantalum, rhenium, osmium, iridium, ruthenium, hafnium, zirconium, vanadium, chromium, as well as electrically conductive alloys, oxides, and nitrides of these metals. Preferably, the composition is the same or substantially similar in nature to the material used to form the anode body. In one particular embodiment, for example, tantalum metal particles are employed for bonding to a tantalum anode.

To form the paste, the particles may be initially dispersed in a solvent. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. One particular benefit of the present invention is that aqueous solvents (e.g., water) may be employed. In fact, water may constitute about 20 wt. % or more, in some embodiments, about 50 wt. % or more, and in some embodiments, about 75 wt. % to 100 wt. % of the solvent(s) used in the paste.

The total concentration of solvent(s) employed in the paste may vary, but is typically from about 1 wt. % to about 40 wt. %, in some embodiments from about 5 wt. % to about 30 wt. %, and in some embodiments, from about 10 wt. % to about 20 wt. % of the paste. Of course, the specific amount of solvent(s) employed depends in part on the desired solids content and/or viscosity of the paste. For example, the solids content may range from about 40% to about 98% by weight, more particularly, between about 50% to about 96% by weight, and even more particularly, between about 60% to about 95% by weight. By varying the solids content of the paste, the presence of the refractory metal particles may be controlled. For example, to form a paste with a higher level of particles, the formulation may be provided with a relatively high solids content so that a greater percentage of the particles are incorporated into the paste.

The paste may also employ an adhesive to help retain the particles in an undisrupted position and/or assist in the adherence of the paste to the desired surface. Although any adhesive may be employed, organic adhesives are particularly suitable for use in the present invention. Examples of such adhesives may include, for instance, epoxy compounds (e.g., two-component UHU epoxy adhesive); poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); silicon polymers, such as poly(methyl siloxane), poly(methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates.

In addition to adhesives, the paste may also include other components. For example, one or more dispersants may be employed in the paste to reduce the surface tension of the suspension. One class of suitable dispersants includes anionic compounds having acid groups or salts thereof. Such compounds, for example, may contain at least one ethylenically unsaturated acid containing monomer and optionally at least one ethylenically unsaturated nonionic monomer. Suitable acid monomers include monomers having carboxylic acid groups, such as acrylic acid, methacrylic acid, itaconic acid, fumaric acid, crotonic acid, maleic acid, monomethyl itaconate, monomethyl fumarate, and monobutyl fumarate; anhydrides, such as maleic anhydride and itaconic anhydride; or combinations thereof. Suitable ethylenically unsaturated monomers include alkyl esters of (meth)acrylic acid, such as ethyl acrylate, butyl acrylate, and methyl methacrylate; hydroxy esters of (meth)acrylic acid, such as hydroxyethyl methacrylate, hydroxyethyl acrylate, hydroxypropyl acrylate, and hydroxypropyl methacrylate; aromatic monomers, such as styrene and α-methyl styrene; and alkenes, such as di-isobutylene.

A wetting agent, or surfactant, may also be employed in the paste to facilitate the formation of homogeneously uniform pastes having desirable spreadability. Suitable surfactants may include cationic surfactants, nonionic surfactants, anionic surfactants, amphoteric surfactants, and so forth. Nonionic surfactants, for instance, may have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. Particularly suitable nonionic surfactants may include the polyethylene oxide condensates of one mole of alkyl phenol containing from about 8 to 18 carbon atoms in a straight- or branched-chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisooctylphenol condensed with about 15 moles of ethylene oxide per mole of phenol.

Plasticizers may also be employed in the paste to enhance the film-forming characteristics of the paste. Plasticizers are well-known and a wide range of plasticizers can be employed. Examples of typical plasticizers include mineral oil; glycols, such as propylene glycol; phthalic esters, such as dioctyl phthalate and benzyl butyl phthalate; and long-chain aliphatic acids, such as oleic acid and stearic acid; and mixtures thereof.

The concentration of each component of the paste may vary depending on the amount of particles desired, the wet pick-up of the application method utilized, etc. For example, the amount of the particles within the paste generally ranges from about 40 wt. % to about 98 wt. %, in some embodiments from about 50 wt. % to about 96 wt. %, and in some embodiments, from about 60 wt. % to about 95 wt. %. Adhesive(s) may also constitute from about 0.01 wt. % to about 20 wt. %, in some embodiments from about 0.1 wt. % to about 15 wt. %, and in some embodiments, from about 1 wt. % to about 10 wt. % of the paste. Other components, such as dispersants, surfactants, plasticizers, etc., may each constitute from about 0.001 wt. % to about 10 wt. %, in some embodiments from about 0.01 wt. % to about 5 wt. %, and in some embodiments from about 0.1 wt. % to about 3 wt. % of the paste.

As indicated above, the refractory metal paste of the present invention is used to electrically connect the anode body of a solid electrolytic capacitor to the anode lead. The anode body may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2$/g, in some embodiments from about 0.5 to about 5.0 $m^2$/g, and in some embodiments, from about 1.0 to about 2.0 $m^2$/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/$cm^3$, in some embodiments from about 0.2 to about 4.0 g/$cm^3$, and in some embodiments, from about 0.5 to about 3.0 g/$cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Figure 2:
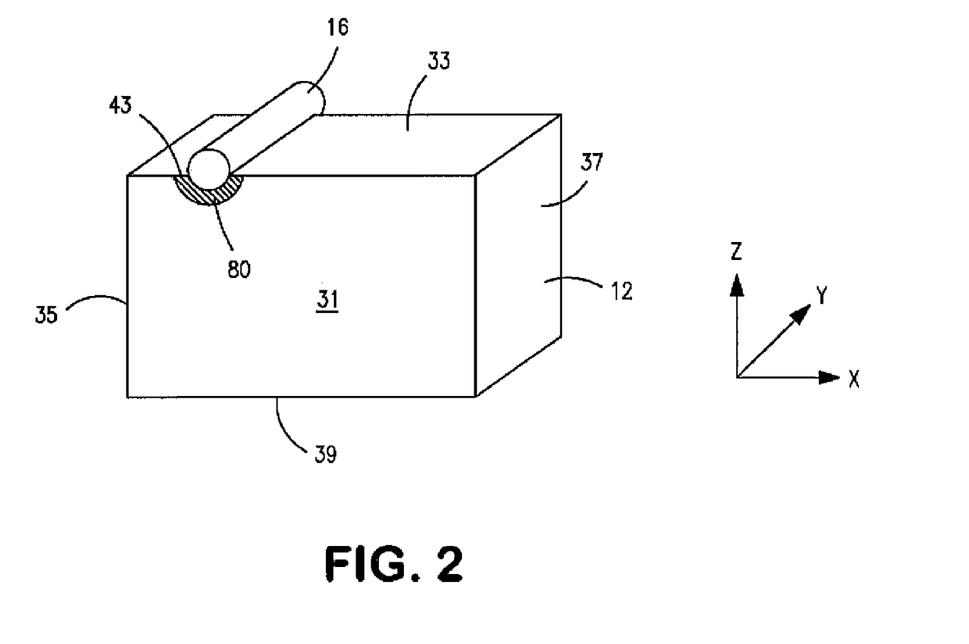
FIG. 2 is a perspective view of one embodiment of an anode body connected to an anode lead through a refractory metal paste.

The anode lead may be in the form of a wire, sheet, etc., and may be formed from a valve metal compound, such as tantalum, niobium, niobium oxide, etc. Referring to FIG. 2, for example, one embodiment is shown in which an anode wire 16 is connected to an upper surface 33 of an anode body 12 using the refractory metal paste of the present invention. It should be understood, however, that the anode wire 16 may also be connected one or more other surfaces of the anode body 12, such as side surface 35, side surface 37, front surface 31, bottom surface 39, and/or rear surface (not shown). If desired, the anode body may also contain a recessed region to accommodate the shape of the anode lead. In FIG. 2, for example, a recessed region 43 is defined in the surface 33 of the anode body 12 that has a "U-shape" for accommodating the generally circular-shaped anode wire 16.

Any of a variety of techniques may generally be employed to apply the refractory metal paste to the anode body, such as heat treating, thermal sintering, sputtering, screen-printing, dipping, electrophoretic coating, electron beam deposition, spraying, roller pressing, brushing, doctor blade casting, vacuum deposition, coating, etc. Once applied, the refractory metal paste may be optionally heated to remove any adhesive/lubricant present. Regardless, the paste is sintered so that the particles form a bond with both the anode lead and anode body. Sintering of the paste in accordance with the present invention may occur before and/or after the anode body is sintered. In one particular embodiment, the refractory metal paste is co-sintered with the anode body. The temperature at which the paste is sintered may range, for example, from about 1000° C. to about 2500° C., in some embodiments from about 1000° C. to about 2000° C., and in some embodiments from about 1200° C. to about 1800° C. Sintering may occur at any desired pressure. In certain embodiment, sintering may occur at a relatively low pressure, such as less than about 200 millitorr, in some embodiments less than about 100 millitorr, and in some embodiments, less than about 50 millitorr. The total time of sintering may also range from about 10 minutes to about 1 hour.

As indicated above, sintering causes a bond to form between the particles of the refractory metal paste and the metal of both the anode body and the anode lead. A strong connection may thus be achieved between the anode lead and anode body without embedding the lead into the body. Because it is not embedded within the anode body, a significant portion of the surface area of the anode lead can remain available for subsequent bonding to an anode termination. This, in turn, means that the anode lead does not need to extend outwardly beyond the anode body for attaching to the termination. In this regard, only a small portion, if any, of the anode lead may extend outwardly beyond the anode body. Referring again to FIG. 2, for instance, the anode wire 16 of this embodiment generally extends in a longitudinal direction along the -y axis. The length that the anode wire 16 extends in the -y direction beyond the front surface 31 or the rear surface (not shown) is generally kept small to optimize volumetric efficiency. For example, although the actual lengths may vary depending on the case size of the capacitor, the ratio of the distance that the wire 16 extends beyond a surface of the anode body in the longitudinal direction to the length of the anode body in the same direction is typically about 0.5 or less, in some embodiments about 0.1 or less, and in some embodiments, from about 0.001 to about 0.05. The desired length of the anode lead may be achieved by simply selecting a lead with the appropriate length, or by cutting the lead to the desired length after it is attached. In addition to optional cutting steps, the lead may also be ground so that it possesses a relatively flat surface for subsequent connection to an anode termination.

In the embodiments described above, the refractory metal paste directly contacts the anode body and lead. Nevertheless, it should be understood that one or more materials may also be employed between the paste and the component(s) to assist in the connection. For example, a layer of seed particles (not in the form of a paste) may be disposed between the paste and anode body to improve adhesion. Such seed layer particles may include a valve metal material (e.g., tantalum) such as described above.

Once attached to the lead, the anode body may be anodized so that a dielectric layer is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is Ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 250° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The anodized part may be subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H. C. Starck. CLEVIOS C is a commercially available catalyst for CLEVIOS M, which is 3,4-ethylene dioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. Techniques, such as described above, may be described in more detail in U.S. Publication No. 2008/232037 to Biler.

In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Techniques, such as described above, may be described in more detail in U.S. Pat. No. 7,460,358 to Biler. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

Once applied, the solid electrolyte may be healed. Healing may occur after each application of a solid electrolyte layer or may occur after the application of the entire coating. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Figure 3:
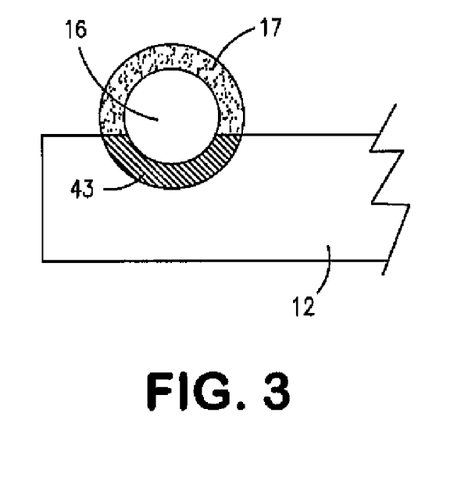
FIG. 3 is a cross-sectional, exploded view of the anode body and lead shown in FIG. 2.

It may be desired in some cases to electrically isolate the anode termination from the cathode termination so that the capacitor functions in the desired manner. To achieve such isolation, a variety of techniques may be implemented. In one embodiment, for instance, any oxide and/or cathode layer(s) formed on the lead may simply be removed through an etching process (e.g., chemical, laser, etc.). Likewise, a protective coating may also be formed on the anode lead prior to anodization to protect it from contact with the anodizing solution and/or solid electrolyte. Referring to FIG. 3, for example, one embodiment of an anode body 12 is shown that is electrically connected to an anode wire 16 via a refractory metal paste 43. In this particular embodiment, a protective coating 17 is disposed over the anode wire 16 to help isolate the anode lead from the cathode during subsequent processing steps, such as described above. When employed, the coating may be insulative and have a specific resistivity of greater than about 10 $\Omega$/cm, in some embodiments greater than about 100, in some embodiments greater than about 1,000 $\Omega$/cm, in some embodiments greater than about $1\times10^5$ $\Omega$/cm, and in some embodiments, greater than about $1\times10^{10}$ $\Omega$/cm. Examples of such insulative materials may include polymers, such as polyurethane, polystyrene, esters of unsaturated or saturated fatty acids (e.g., glycerides), polytetrafluoroethylene (e.g., Teflon™), and so forth.

As indicated above, the electrolytic capacitor of the present invention also contains an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters.

The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

Figure 1:
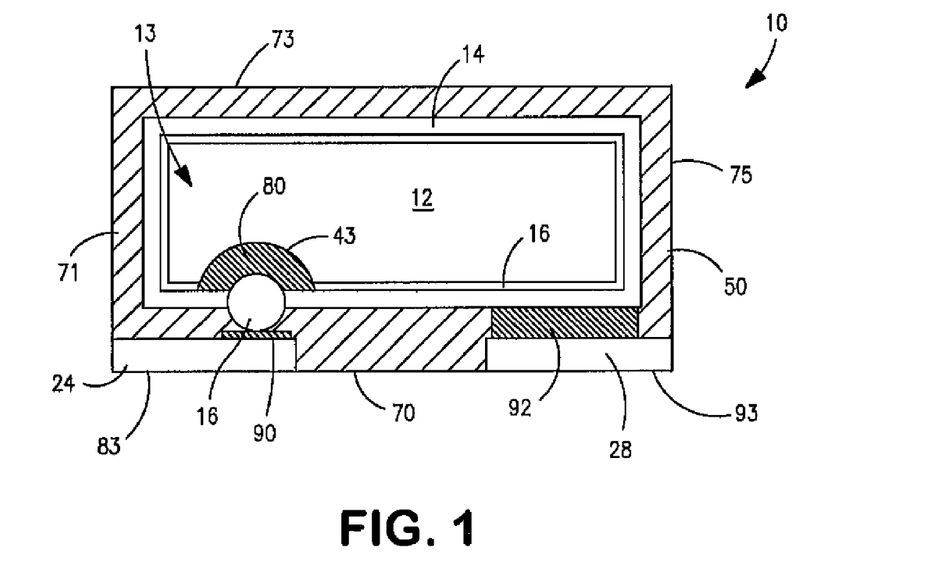
FIG. 1 is a cross-sectional view of one embodiment of the solid electrolytic capacitor of the present invention.

Referring to FIG. 1, one embodiment of an electrolytic capacitor 10 is shown that includes an anode termination 24 and a cathode termination 28 in electrical connection with a capacitor element 13. The terminations 24, 28 and the capacitor element 13 are encapsulated within a case 50 so that the resulting capacitor 10 has an upper surface 73, side surfaces 71 and 75, a lower surface 70, and front and rear surfaces (not shown). The capacitor element 13 likewise includes an anode body 12, dielectric layer 16, and a cathode layer 14, and has an upper surface 33, lower surface 39, side surfaces 35 and 37, and a rear surface (not shown).

The cathode termination 28 is electrically connected to the lower surface 39 of the capacitor element 13 via a conductive adhesive 92. The anode termination 24 is likewise electrically connected to the anode wire 16 via a conductive adhesive 90. Of course, it should be understood that any other known method for connecting the terminations may also be employed in the present invention. In any event, the anode termination 24 and the cathode termination portion 28 are generally parallel and coplanar with one another and optionally with the lower surface 39 of the capacitor element 13. Exposed portions of the anode and cathode terminations 24 and 28 define lower surfaces 83 and 93, respectively, that face away from the lower surface 39 of the capacitor element 13. In this manner, the lower surfaces 83 and 93 of the terminations may be generally parallel and coplanar with a lower surface 70 of the capacitor 10. Although not required, other portions of the anode termination 24 and cathode termination 28 may also remain exposed after encapsulation. In FIG. 1, for instance, the terminations 24 and 28 are also exposed at side surfaces 71 and 75, respectively, of the case 50.

Figure 4:
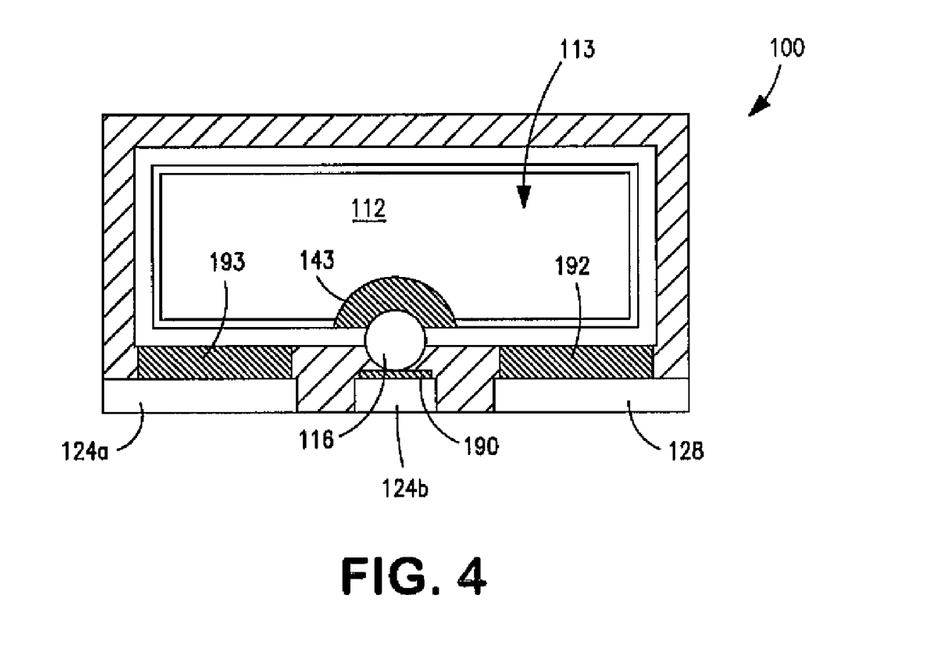
FIG. 4 is a cross-sectional view of another embodiment of the solid electrolytic capacitor of the present invention.

In the embodiment shown in FIG. 1, the anode wire 16 is electrically connected to a single anode termination 24. It should be understood, however, that the particular location position and location of the lead and/or terminations may vary depending on the desired result. Referring to FIG. 4, for example, a capacitor 100 is shown that includes a capacitor element 113, cathode termination 128, and an anode termination defined by a first component 124a and a second component 124b. In this particular embodiment, an anode lead 116 is connected to an anode body 112 of the capacitor element 113 via a refractory metal paste 143 and to the second component 124b via a conductive adhesive 190. Likewise, the first component 124a is connected to the capacitor element 113 via a conductive adhesive 193 and the cathode termination 128 is connected to the capacitor element 113 via a conductive adhesive 192. By disposing the anode lead 116 between two different terminations, as shown, the robustness of the resulting capacitor 100 may be improved.

Of course, the present invention is by no means limited to embodiments in which a wire is used for the anode lead, such as described above. In another embodiment, for example, the capacitor may lack a lead wire and instead employ a sheet (e.g., plate, foil, etc.) that is bonded to the anode body with the metal paste of the present invention. Various examples of such capacitors are described, for instance, in U.S. Pat. No. 5,357,399 to Salisbury; U.S. Pat. No. 6,751,085 to Huntington; U.S. Pat. No. 6,643,121 to Huntington; U.S. Pat. No. 6,849,292 to Huntington; U.S. Pat. No. 6,673,389 to Huntington; U.S. Pat. No. 6,813,140 to Huntington; and U.S. Pat. No. 6,699,767 to Huntington, which are incorporated herein in their entirety by reference thereto for all purposes.

Figure 5:
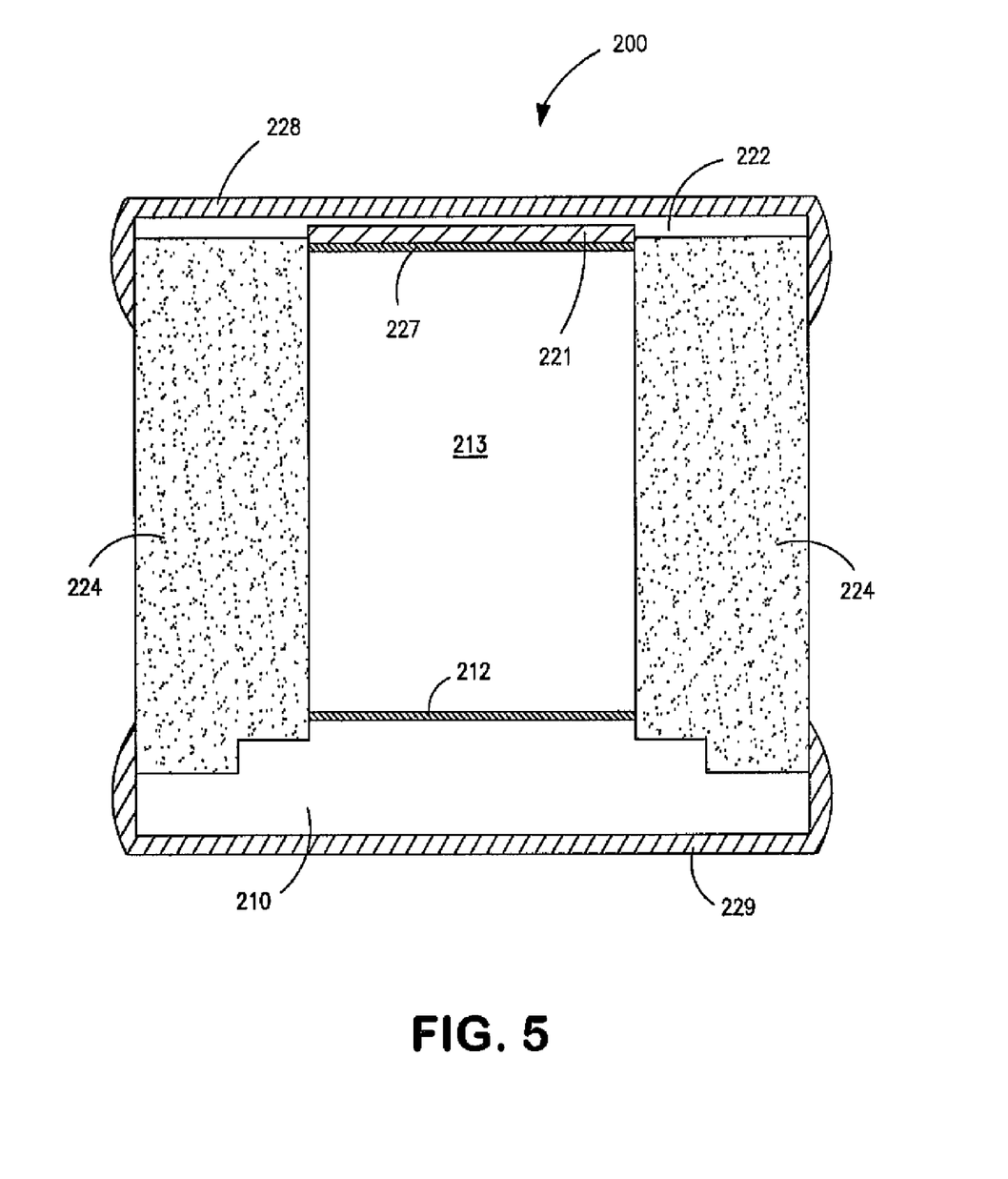
FIG. 5 is a cross-sectional view of yet another embodiment of the solid electrolytic capacitor of the present invention.

Referring to FIG. 5, for instance, one embodiment of a capacitor 200 is shown that includes an anode lead 210 in the form of a sheet. The anode lead 210 in this embodiment is bonded to a compressed anode body 213 made from a valve metal composition (e.g., tantalum) using the refractory metal paste of the present invention. The paste 212 may be initially applied to a surface of the anode lead 210. Thereafter, the compressed anode body 213 may be disposed over the paste 212. The anode body 213 and the anode lead 210 may then be sintered to cause a bond to form between the particles of the refractory metal paste and the metal of both the anode body and the anode lead. Once attached, the anode body 213 may then be anodized and applied with a solid electrolyte as described above. If desired, additional layers may be employed, such as a carbon layer 227 and/or one or more silver layers 221 or 222. The capacitor 200 may also include an encapsulating resin at side walls 224 that sheath the anode body 213. End caps 228 and 229 are provided as cathode and anode terminations, respectively, of the capacitor 200.

The present invention may be better understood by reference to the following examples.

Test Procedures

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

EXAMPLE 1

150,000 μFV/g tantalum powder was pressed into pellets with diameters of 26.5×2.2×0.65 (length×width×thickness) and glued with a tantalum ribbon using tantalum paste as described above. The powder was then sintered to form a porous electrode body. The pellets were anodized in a phosphoric acid electrolyte in water and subsequently shell formed in water/ethylene glycol electrolyte to form the dielectric layer. A manganese dioxide solid electrolyte was formed by the pyrolytic decomposition of manganous nitrate $(Mn(NO_3)_2)$. The pellets were then coated with a graphite coating and a silver coating. The finished parts were completed by conventional assembly technology and measured.

EXAMPLE 2

150,000 μFV/g tantalum powder was pressed into pellets and sintered to form a porous electrode body using conventional pressing technology. The pellets were anodized in a phosphoric acid electrolyte in water and subsequently shell formed in water/ethylene glycol electrolyte. A manganese dioxide solid electrolyte was formed by the pyrolytic decomposition of manganous nitrate ($Mn(NO_3)_2$). The pellets were then coated with a graphite coating and a silver coating. The finished parts were completed by conventional assembly technology and measured.

The electrical properties of the samples made in Examples 1 and 2 were then tested. The results are shown below in Table 1.

TABLE 1

| Capacitor | Cap (μF) | DF (%) | ESR (mΩ) | Leakage Current (μA) |
|---|---|---|---|---|
| Example 1 | 154 | 5.1 | 195 | 1.2 |
| Example 2 | 137 | 5.2 | 240 | 4.9 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
    a capacitor element that includes an anode body, a dielectric layer overlying at least a portion of the anode body, and a cathode overlying at least a portion of the dielectric layer, the cathode including a solid electrolyte, and wherein the anode body is a pressed porous pellet;
    an anode lead that is electrically connected to a surface of the anode body by a refractory metal paste that contains a plurality of particles having an average size of from about 0.1 to about 20 micrometers, wherein the paste has a thickness of from about 0.01 to about 50 micrometers, wherein the particles are sinter bonded to both the anode lead and the anode body;
    an anode termination that is electrically connected to the anode lead;
    a cathode termination that is electrically connected to the cathode; and
    a case that encloses the entire capacitor element so that the capacitor has an upper surface and opposing lower surface, wherein at least a portion of the anode termination and at least a portion the cathode termination remain exposed by the case at the lower surface of the capacitor.

2. The solid electrolytic capacitor of claim 1, wherein the anode body includes tantalum, niobium, or an electrically conductive oxide thereof.

3. The solid electrolytic capacitor of claim 1, wherein the anode lead contains tantalum or niobium.

4. The solid electrolytic capacitor of claim 1, wherein the particles are formed from tantalum.

5. The solid electrolytic capacitor of claim 1, wherein the particles have an average size of from about 1 to about 10 micrometers.

6. The solid electrolytic capacitor of claim 1, wherein the solid electrolyte includes manganese dioxide or a conductive polymer.

7. The solid electrolytic capacitor of claim 1, wherein the anode lead is a wire.

8. The solid electrolytic capacitor of claim 1, wherein the anode lead is a sheet or ribbon.

9. The solid electrolytic capacitor of claim 1, wherein the anode termination and cathode termination both extend primarily in a direction that is parallel to a first surface of the capacitor element, the anode and cathode terminations being electrically connected to the first surface of the capacitor element.

10. The solid electrolytic capacitor of claim 1, wherein the exposed portions of the anode termination and the cathode termination are generally coplanar.

11. The solid electrolytic capacitor of claim 1, wherein the paste has a thickness of from about 1 to about 25 micrometers.

12. The solid electrolytic capacitor of claim 1, wherein a single refractory metal paste is used to electrically connect the anode lead to a surface of the anode body.

* * * * *